United States Patent
Shaki

(10) Patent No.: US 6,929,119 B2
(45) Date of Patent: Aug. 16, 2005

(54) AROMA-PRESERVING CANISTER

(75) Inventor: Nechama Shaki, Tel Aviv (IL)

(73) Assignee: NE. S Inc., Ontario (CA)

( * ) Notice: Subject to any disclaimer, the term of this patent is extended or adjusted under 35 U.S.C. 154(b) by 0 days.

(21) Appl. No.: 10/169,188

(22) PCT Filed: Dec. 24, 2000

(86) PCT No.: PCT/IL00/00856

§ 371 (c)(1),
(2), (4) Date: Oct. 25, 2002

(87) PCT Pub. No.: WO01/49573

PCT Pub. Date: Jul. 12, 2001

(65) Prior Publication Data

US 2003/0075460 A1 Apr. 24, 2003

(30) Foreign Application Priority Data

Dec. 29, 1999 (IL) .................................................. 133778

(51) Int. Cl.⁷ ............................................. B65D 25/08
(52) U.S. Cl. .................................. 206/221; 215/DIG. 8
(58) Field of Search ................................. 222/454, 446, 222/490; 206/219, 222, 221; 215/DIG. 8

(56) References Cited

U.S. PATENT DOCUMENTS 2,446,085 A 7/1948 Gronemeyer
3,091,374 A 5/1963 Scharyzman
3,563,413 A * 2/1971 Gordon ...................... 222/83.5
4,195,730 A * 4/1980 Hunt ........................... 206/221
4,264,007 A * 4/1981 Hunt ........................... 206/219
4,634,003 A * 1/1987 Ueda et al. ................. 206/221
4,776,972 A * 10/1988 Barrett ................... 252/186.38
4,863,017 A * 9/1989 Vlock ......................... 206/219
5,346,105 A 9/1994 Onneweer
6,386,872 B1 * 5/2002 Mukasa et al. ............... 433/90
6,513,650 B2 * 2/2003 Mollstam et al. ........... 206/222

FOREIGN PATENT DOCUMENTS

| DE | 484 326 | 5/1938 |
|---|---|---|
| JP | 11-208702 | 8/1999 |

* cited by examiner

Primary Examiner—Shian T. Luong
(74) Attorney, Agent, or Firm—Lowe Hauptman & Berner, LLP

(57) ABSTRACT

An improved canister for preserving aroma of coffee or spices includes a hollow body and a cap sealing the body. An elastic disk sealing the canister is placed inside the canister under the cap. The disk has a major stationary portion and a minor movable portion. The cap, the body of the canister or the movable portion includes an element for pressing and bending the disk movable portion downwardly when the canister is capped. The disk movable portion is retracted back to its original sealing position when the canister is uncapped.

8 Claims, 2 Drawing Sheets

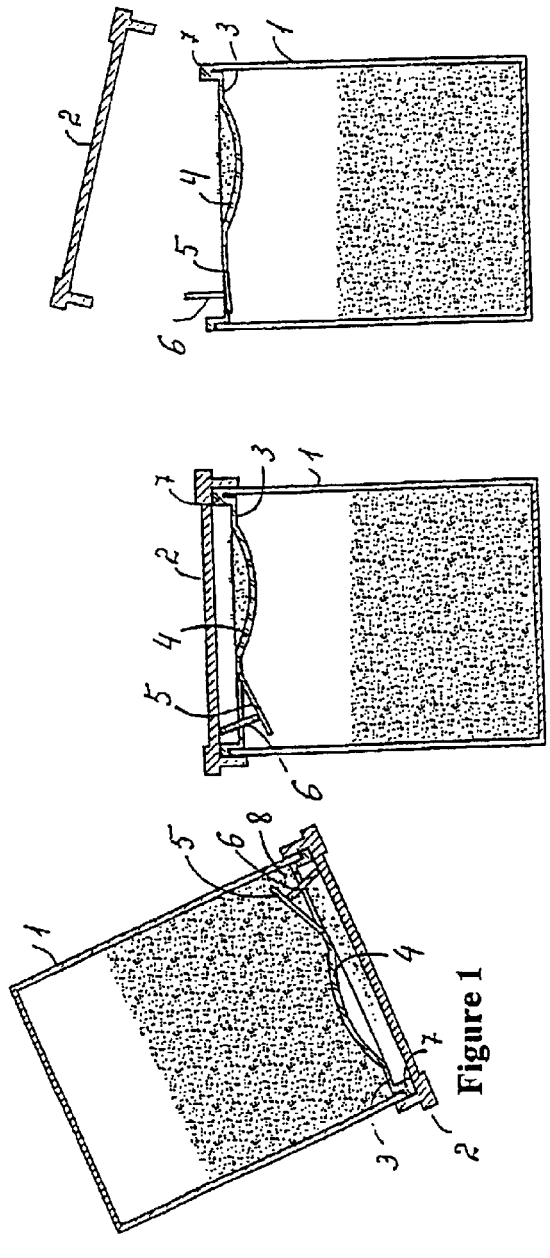

AROMA-PRESERVING CANISTER

FIELD AND BACKGROUND OF THE INVENTION

The present invention relates to an improved canister useful for preserving aroma of granulated products, especially coffee.

A common disadvantage of canisters for coffee and other granulated products is that the products gradually loose their aroma as the canister is opened more and more. The aim of the present invention is to preserve the aroma of canned granulated products despite these multiple openings.

SUMMARY OF THE INVENTION

The improved canister according to the present invention for preserving the aroma freshness and hygienics of coffee or other granulated fragrant products comprises the hollow body of the canister and a cap sealing said body, and this canister is characterized by having an elastic disk placed horizontally inside said canister at about 0.5–1.5 cm under the cap so as the fragrant product is contained in the canister under this disk. The disk seals the canister product when the canister is uncapped, and the disk is "opened" when the canister is capped. The disk consists of two portions: a major stationary portion and a minor movable portion. The cap, or the body of the canister, or the movable portion of the disk includes a means for pressing and bending said movable portion of the disk downwardly when the canister is capped.

In the "open" position when the canister is capped and the movable portion of the disk is bent downwardly, there is a space between the side wall of the canister and the edge of the movable portion of the disk, allowing portioning-up the product. The product is portioned by turning the canister upside down and by returning it back into its normal position. When the capped canister is inverted upside down, coffee is poured down through this space. On returning the canister into its normal position, a portion of coffee remains on the stationary part of the disk under the cap while the rest of the coffee pours back into the lower part of the canister through the space formed by the movable portion of the disk oriented downwardly. When the user removes the cap of the canister, a spring under the disk pushes the disk movable part. The disk movable part is sealing the canister, and only this coffee portion can be poured out into the user's cup, so that the product in the canister is scaled and preserved.

The stationary portion of the disk may have a spoon-like concave depression on its side facing the cap of the canister, thus providing a better and exact portioning of the product.

In a preferred embodiment, said means for pressing and bending the movable portion downwards is a protrusion located on the internal side of the cap of the canister and directed downwardly, or a protrusion located on the movable portion of the disk and directed upwardly.

For purposes of this specification and the accompanying claims the term "protrusion" refers also to a rod.

According to the present invention, when the cap is closed the disk is open and when the cap is open the disk is closed.

As an alternative, the movable portion of the disk is retracted to its initial horizontal sealing position (when the canister is uncapped) by the elastic force of the material of the disk itself, or by an additional means to make the retraction more efficient, e.g., by a spring fastened by one end to said movable portion and by another end to a specific projection from the stationary portion of the disk.

In a preferred embodiment, the elastic disk to be installed and operated in the improved canister is comprised of a major stationary portion and a minor movable portion having suitable dimensions fitted to the canister.

When the movable disk is pushed down by the cap, pressing the rod, the disk creates a situation of horizontally disk that enables the product to enter the curved spoon.

The rod must be always higher then the edge of the inside disk.

The disk can be of one unit but for security reasons the rod can be supplied separately from the disk. The rod can be connected to the groove by the consumer.

DEFINITIONS

For purposes of this specification and the accompanying claims the term "canister" refers to a canister having solid walls or any package box for preserving an aroma and/or freshness and hygienic of different products, including for example coffee and other powders or granulated products.

DETAILED DESCRIPTION OF THE INVENTION

The present invention will be described in detail by FIGS. 1–7. This detailed description is not intended to limit the scope of the invention, but only to illustrate the preferred embodiments.

FIG. 1 illustrates the capped aroma-preserving coffee canister with a protrusion on the movable portion of the disk, turned upside down for portioning-up coffee.

FIG. 2 illustrates the capped aroma-preserving coffee canister with a protrusion on the movable portion of the disk in its normal position.

FIG. 3 illustrates an uncapped aroma-preserving coffee canister with a protrusion on the movable portion of the disk.

FIG. 4 illustrates an uncapped aroma-preserving coffee canister with a protrusion on the internal part of the cap of the canister.

FIGS. 1–3 illustrate a preferred embodiment having a protrusion on the movable portion of the disk.

Figure 6:
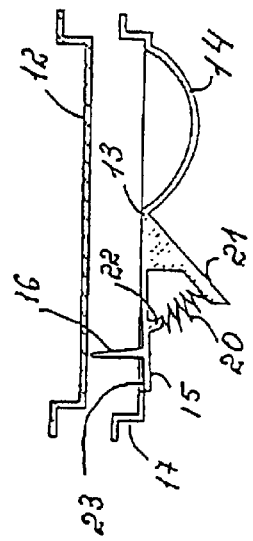
FIG. 6 illustrates an alternative embodiment the present invention with a retracting spring in the position wherein the canister is uncapped.

FIG. 1 illustrates the capped coffee canister, turned upside down for portioning-up coffee. Cap (2) presses protrusion (6). Movable portion (5) of disk (7) is bent towards the bottom of the canister. Coffee pours down through the space (8) between side wall of canister body (1) and the edge of movable portion (5) of disk (7) and enters the space between cap (2) and stationary portion (3) with depression (4).

FIG. 2 illustrates the canister body (1), closed by cap (2). Cap (2) presses protrusion (6) of movable portion (5) of disk (7), thus bending movable portion (5) downwards. A portion of coffee is left in depression (4).

FIG. 3 illustrates a position when cap (2) is removed from canister body (1) and does not press protrusion (6). Movable portion (5) of disk (7) seals the canister. Depression (4) of stationary portion (3) of disk (7) contains a portion of coffee ready for use.

FIG. 4 illustrates a preferred embodiment with a protrusion on internal part of the cap of the canister. Cap (2) with protrusion (6) is removed from the canister body (1). Movable portion (5) of disk (7) is in its sealing position. A portion of coffee is left in depression (4) of stationary part (3) of disk (7).

Figure 5:
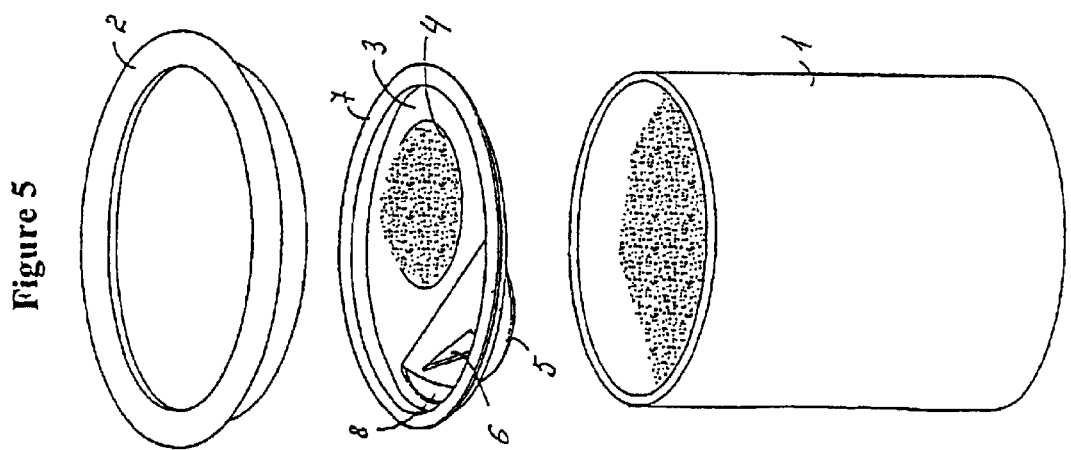
FIG. 5 illustrates a perspective view of an aroma-preserving coffee canister.

In FIG. 5, a capped coffee canister is shown in a perspective view according to FIG. 2. Cap (2), disk (7) and canister body (1) are conditionally separated from each other. Cap (2) presses protrusion (6) and thus bends movable portion (5) of disk (7) downwards so as space (8) forms between the side wall of canister body (1) and the edge of movable portion (5) of disk (7). A portion of coffee is left in depression (4) of stationary portion (3) of disk (7).

FIG. 6 illustrates an alternative embodiment of the present invention with retractive spring (20) in a position wherein the canister is uncapped. Movable portion (15) of disk (17) is equipped with retracting spring (20). Spring (20) extends from protrusion (21) of stationary portion (13) of disk (17) to protrusion (22) of movable portion (15) of disk (17) and is attached to both of these protrusions. When cap (12) is open, it does not press down protrusion (16) of movable portion (15). Due to that, spring (15) is released and presses movable portion (15) upwardly into its sealing position wherein it closes opening (23) of disk (17) and thus seals the canister.

Figure 7:
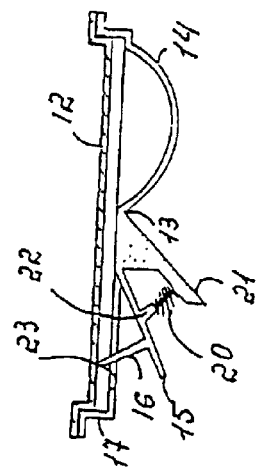
FIG. 7 illustrates the embodiment of FIG. 6 in the position wherein the canister is capped.

FIG. 7 illustrates the embodiment of FIG. 6 in the position wherein the canister is capped. In this position, cap (12) presses down protrusion (16) of movable portion (15) of disk (17) and bends movable portion (15) downwards, pushing it away from opening (23) and thus compressing spring (20). Spring (20) is attached to protrusion (21) of stationary portion (13) of disk (17) and to protrusion (22) of movable portion (15) of the disk. When the coffee canister is capped, a portion of coffee can be poored out through opening (23) into depression (14) by turning the coffee canister upside down.

What is claimed is:

1. An aroma preserving canister for coffee or other granulated product having aroma, said canister comprising:
   a hollow body of the canister;
   a cap sealing said hollow body; and
   a disk sealing said coffee or product when the canister is uncapped;
   wherein
   said disk is placed horizontally inside said canister at about 0.5–1.5 cm under the cap, said disk having a major stationary portion and a minor movable portion;
   the cap and the movable portion contain mutual means for maintaining said movable portion pressed downwardly thus unsealing said coffee or product when the canister is capped;
   the connection between the stationary portion and the moveable portion is elastic or provided with means for retracting said disk movable portion back to the horizontal sealing position when the canister is uncapped; and
   said mutual means comprise a protrusion located on the movable portion of the disk and directed upwardly.

2. An aroma preserving canister for coffee or other granulated product having aroma, said canister comprising:
   a hollow body of the canister;
   a cap sealing said hollow body; and
   a disk sealing said coffee or product when the canister is uncapped;
   wherein
   said disk is placed horizontally inside said canister at about 0.5–1.5 cm under the can, said disk having a major stationary portion and a minor movable portion;
   the cap and the movable portion contain mutual means for maintaining said movable portion pressed downwardly thus unsealing said coffee or product when the canister is capped;
   the connection between the stationary portion and the moveable portion is elastic or provided with means for retracting said disk movable portion back to the horizontal sealing position when the canister is uncapped; and
   the stationary portion of the disk has a spoon-shaped concave depression on the side facing the cap of the canister.

3. An aroma preserving canister for coffee or other granulated product having aroma said canister comprising:
   a hollow body of the canister;
   a cap sealing said hollow body; and
   a disk sealing said coffee or product when the canister is uncapped;
   wherein
   said disk is placed horizontally inside said canister at about 0.5–1.5 cm under the cap, said disk having a major stationary portion and a minor movable portion;
   the cap and the movable portion contain mutual means for maintaining said movable portion pressed downwardly thus unsealing said coffee or product when the canister is capped;
   the connection between the stationary portion and the moveable portion is elastic or provided with means for retracting said disk movable portion back to the horizontal sealing position when the canister is uncapped; and
   said movable portion of the disk is retracted back to the horizontal position by a spring fastened by one end to said movable portion and by another end to a specific projection from the stationary portion of the disk.

4. An elastic disk to be installed and operated in a, said canister comprising:
   a hollow body of the canister;
   a cap sealing said hollow body; and
   a disk sealing said coffee or product when the canister is uncapped;
   wherein
   said disk is placed horizontally inside said canister at about 0.5–1.5 cm under the cap, said disk having a major stationary portion and a minor movable portion;
   the cap and the movable portion contain mutual means for maintaining said movable portion pressed downwardly thus unsealing said coffee or product when the canister is capped; and
   the connection between the stationary portion and the moveable portion is elastic or provided with means for retracting said disk movable portion back to the horizontal sealing position when the canister is uncapped;
   wherein the elastic disk comprises said major stationary portion and said minor movable portion having suitable dimensions fitted to the canister, said minor moveable portion comprising an upwardly oriented protrusion adapted to maintain the moveable portion down when pressed by the cap of the capped canister.

5. An aroma preserving canister, comprising:
   a hollow body;

a cap for sealing said hollow body; and a moveable auxiliary sealing member having a sealing position in which said auxiliary sealing member seals a portion of said hollow body, said auxiliary sealing member being placed inside said hollow body under said cap;

wherein when the canister is capped, said cap moves said auxiliary sealing member away from the sealing position and against a biasing force;

when the canister is uncapped, said auxiliary sealing member is returned to the sealing position by said biasing force; and said canister further comprises a spring generating said biasing force.

6. The canister of claim 5, further comprising a disk having a stationary portion and a moveable portion defining said auxiliary sealing member.

7. The canister of claim 6, wherein said spring has opposite end portions fastened to said stationary and moveable portions, respectively.

8. The canister of claim 7, wherein said disk is placed horizontally inside said canister at about 0.5–1.5 cm under the cap.

* * * * *